United States Patent
Beverly et al.

(10) Patent No.: US 8,493,985 B2
(45) Date of Patent: Jul. 23, 2013

(54) NETWORK MESSAGE TRANSFORMATION DEVICE AND METHODS THEREOF

(75) Inventors: Harlan T. Beverly, McDade, TX (US); Charles Musta, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 12/355,609

(22) Filed: Jan. 16, 2009

(65) Prior Publication Data

US 2009/0185581 A1 Jul. 23, 2009

Related U.S. Application Data

(60) Provisional application No. 61/021,889, filed on Jan. 17, 2008.

(51) Int. Cl.
*H04L 29/06* (2006.01)
*H04L 29/08* (2006.01)

(52) U.S. Cl.
CPC .... *H04L 29/06027* (2013.01); *H04L 29/08747* (2013.01)
USPC .......................................................... 370/401

(58) Field of Classification Search
CPC ...................... H04L 29/06027; H04L 29/08747
USPC .......................................................... 370/401
See application file for complete search history.

(56) References Cited

U.S. PATENT DOCUMENTS

| | | | |
|---|---|---|---|
| 7,088,276 B1 * | 8/2006 | Wegener | 341/155 |
| 2003/0110229 A1 | 6/2003 | Kulig et al. | |
| 2005/0147122 A1 * | 7/2005 | Florimond Van Acker et al. | 370/468 |
| 2006/0013235 A1 * | 1/2006 | Farnham | 370/401 |
| 2006/0227747 A1 | 10/2006 | Kim et al. | |
| 2006/0245516 A1 * | 11/2006 | Simon | 375/295 |
| 2007/0047516 A1 * | 3/2007 | Kottilingal | 370/352 |
| 2007/0180449 A1 | 8/2007 | Croft et al. | |
| 2008/0028204 A1 * | 1/2008 | Masuhiro et al. | 713/152 |
| 2008/0098445 A1 * | 4/2008 | Hildebrand et al. | 725/114 |
| 2009/0013356 A1 * | 1/2009 | Doerr et al. | 725/62 |

OTHER PUBLICATIONS

RFC 3095, Internet Engineering Task Force (Jul. 2001).*
International Search Report for PCT/US09/31311 dated May 26, 2009, 8 pages.

* cited by examiner

*Primary Examiner* — Kibrom T Hailu
*Assistant Examiner* — Benjamin Lamont
(74) *Attorney, Agent, or Firm* — DeLizio Gilliam, PLLC (57) ABSTRACT

A method of transforming messages for communication via a network includes receiving a message from an application being executed at a processor. The message is received at a connection object, which transforms the received message based on characteristics of the connection object. The characteristics can be determined via a negotiation between the source and target of the message. The connection object provides the transformed message to a protocol layer, which forms packets based on the message. The connection object thus transforms each message independent of the transmission protocol used to communicate the message to the target, thereby improving communication bandwidth and efficiency.

27 Claims, 6 Drawing Sheets

NETWORK MESSAGE TRANSFORMATION DEVICE AND METHODS THEREOF

CROSS-REFERENCE TO RELATED APPLICATION(S)

This application claims priority to U.S. Provisional Patent Application No. 61/021,889, entitled "A Protocol Independent Method For The Manipulation Of Data Buffers Sent Between Network Nodes Based On Previously Defined Connection Object Characteristics" filed on Jan. 17, 2008, which is assigned to the current assignee hereof and is incorporated herein by reference in its entirety.

BACKGROUND

1. Field of the Disclosure

The present disclosure relates to network communication, and more particularly to transformation of messages for communication via a network.

2. Description of the Related Art

In network communication, such as communication between peers in a peer-to-peer network, messages are communicated between network nodes. It is sometimes useful to transform message data into a different form for communication via the network. For example, message data can be compressed for more efficient communication, and message data can be encrypted to provide for data security. Transformation of message data is sometimes generally referred to as data munging. Data munging is typically performed by both the source and target node of a message. However, munging can be a computationally intensive process. Further, many network communication protocols require different munging techniques, increasing the complexity of network communication.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A method of transforming messages for communication via a network includes receiving a message from an application being executed at a processor. The message is received at a connection object, which transforms the received message based on characteristics of the connection object. The characteristics can be determined via a negotiation between the source and target of the message. The connection object provides the transformed message to a protocol layer, which forms packets based on the message. The connection object thus transforms each message independent of the transmission protocol used to communicate the message to the target, thereby improving communication bandwidth and efficiency.

Figure 1:
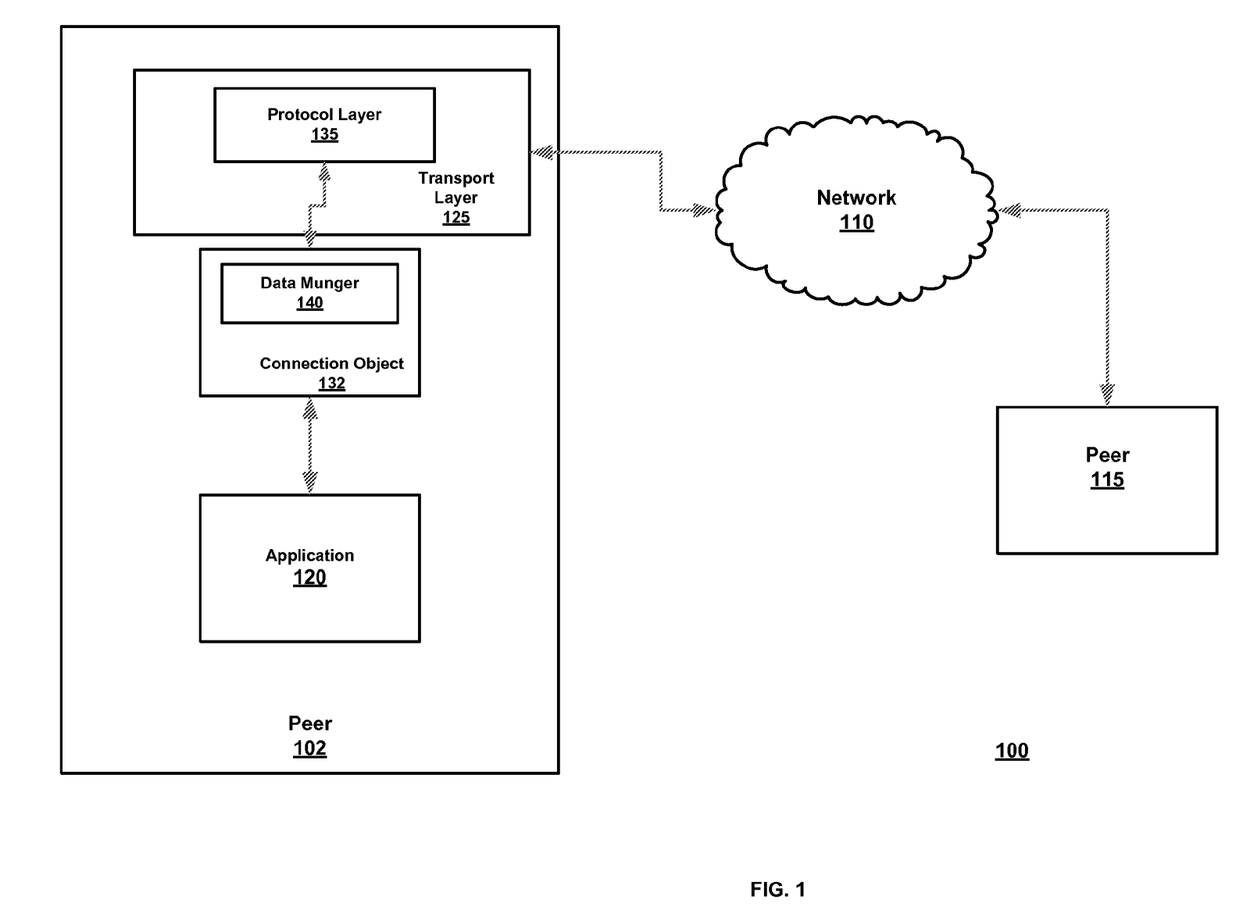
FIG. 1 is a block diagram of a communications network in accordance with one embodiment of the present disclosure.

Referring to FIG. 1, a block diagram of a particular embodiment of a communications network 100 is illustrated. The communications network 100 includes a peer 102, a network 110, and a peer 115. The peer 102 and peer are each connected to the network 110. It will be appreciated that the peer 102 and peer 115 can both transmit and receive information via the network 110. Thus, peer 115 can transmit messages to peer 102, which can receive the transmitted messages, and vice-versa. It will further be appreciated that, although for purposes of discussion peer 102 and peer 115 are illustrated as communication nodes in a peer to peer network, in other embodiments the peers can be arranged in a client-server configuration. In addition, the peer 102 and peer 115 are sometimes referred to as "nodes" or "communication nodes." As used herein a node refers to an electronic device in a network that is able to receive and transmit a communication message. The node that receives a message is referred to as the target node of the message, while the node that creates and transmits the message is referred to as the source node.

Peer 102 includes an application 120 and a transport layer 125. The application 120 is a software application embodied on a computer readable medium including instructions to manipulate a processor in order to execute specified tasks. One such task includes creating messages for communication to peer 115. In particular, in response to specified conditions, such as a user input, request from another application, or other condition, the application 120 can create one or more messages including one or more data payloads for communication to peer 115. The application 120 provides the messages to the transport layer 125 for communication via the network 110. The application 120 can also receive messages communicated from the peer 115 via the network 110. Such messages are provided by the transport layer 125 to the application 120, which analyzes data contained in the message and takes appropriate action based on the data.

The transport layer 125 includes a protocol layer 135. The protocol layer 135 is configured to determine the type of network communication protocol associated with a received message. Based on the type of network communication protocol, the protocol layer 135 can form one or more packets in accordance with the protocol, and provide the one or more packets to the network 110 in accordance with the protocol. Further, the protocol layer can receive packets from the network 110, determine the communication protocol based on the packets, and determine one or more messages in accordance with the determined protocol. Thus, the protocol layer provides a communication layer that processes incoming and outgoing communications according to a communication protocol. This simplifies the design of the application 120 and reduces its overhead, as the application can simply provide messages for communication, without processing each message according to a particular protocol. Examples of communication protocols that can be processed by the protocol layer include TCP/IP, UDP, and the like. In an embodiment, the protocol layer can process incoming and outgoing communications according to different communication protocols, by determining the protocol associated with each message.

In particular, peers 102 and 115 can communicate by establishing a communication session. To establish such a session, one of the peers 102 and 115 sends a request for the session to the other peer via the network 110. The peer that receives the request indicates whether it will accept the session request. If the session is accepted, communications are provided between the peers via the network 110. Establishing a communication session is referred to for purposes of discussion herein as session negotiation. During session negotiation, one of the peers can indicate to the other the type of communication protocol under which the communication session is to be conducted. For example, the communication protocol can be indicated in the communication request, or in the acceptance of the request. The protocol layer at each peer determines the communication protocol during the session negotiation, and processes incoming and outgoing communications for the session based on the determined protocol.

In addition, during session negotiation, the communicating peers can exchange munging information, sometimes referred to herein as munging parameters. Munging, as used herein, refers to transformation of data from one format to another to provide for communication via a network. Examples of munging include encryption, decryption, compression, decompression, mathematical operations such as fast fourier transforms (FFTs), and the like. The munging parameters establish a common munging approach for each peer in the communication session, so that messages can be properly communicated. Examples of munging parameters include encryption keys and compression format or other compression information.

For each communication session, peer 102 establishes a connection object, such as connection object 132. The connection object can be created in response to establishment of a communication session, or an existing connection object can be modified in response to the establishment of the communication session. Each connection object includes a data munger, such as data munger 140, which processes incoming messages (i.e. messages received from the protocol layer 135) and outgoing messages (e.g. messages received from the application 120) based on the munging parameters. For example, the data munger 140 can compress, decompress, encrypt, or decrypt messages based on the munging parameters exchanged between the peers. In an embodiment, the connection object 132 is modified based on the munging parameters, so that all messages provided to the connection object 132 are transformed according to those parameters. Thus, the connection object 132 does not have to make a determination as to the specific munging parameters for each message, thereby reducing the amount of resources required to transform data at the data munger. In addition, the connection object 132 is independent of the protocol layer 135. As used herein, an object is independent of the protocol layer when it is able to perform its function on a message, such as data munging, without regard to the particular protocol that will be used to communicate the message. Because the connection object 132 is independent of the protocol layer, it is able to efficiently perform data munging without regard to a particular protocol. Further, because each message is munged prior to the protocol layer 135, each of the packets created by the protocol layer do not have to carry munging information, such as identifiers indicating whether the data in the packet has been munged. This can reduce the size of packets and improve communication bandwidth.

For example, when connection object 132 is created for a designated communication session, the object can be modified so that it performs compression on each message received from application 120 according to the munging parameters exchanged between peers 102 and 115. Further, connection object 132 can be modified so that it does not perform encryption on each message received from application 120. Accordingly, data munger 140 will compress each received message, but will not encrypt each message. The connection object 132 does not have to make the determination as to how to munge each message. Instead, the transformation of each message is embedded into the connection object 132 itself, reducing overhead and improving communication bandwidth.

Further, different connection objects can be created for different communication sessions, each implementing different munging parameters. Thus, for example, a connection object for one communication session can encrypt and compress each message received from the application 120, while the communication object for another communication session can encrypt, but not compress each message. The munging parameters are thus embedded into each connection object on a per-session basis, providing for a flexible way of implementing munging while reducing overhead and improving communication bandwidth.

Figure 2:
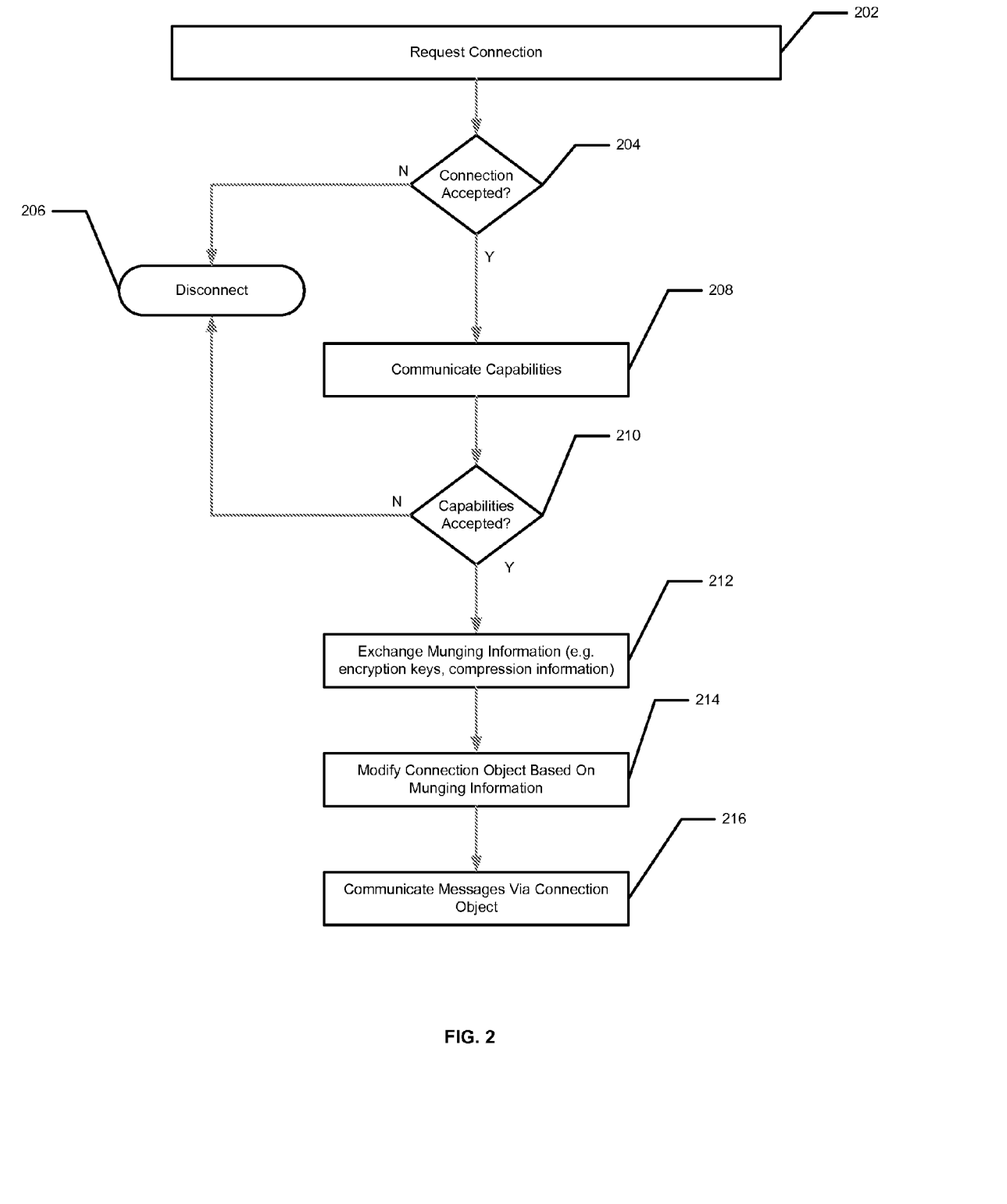
FIG. 2 is a flow diagram of a method of establishing a communication session between network nodes.
Figure 3:
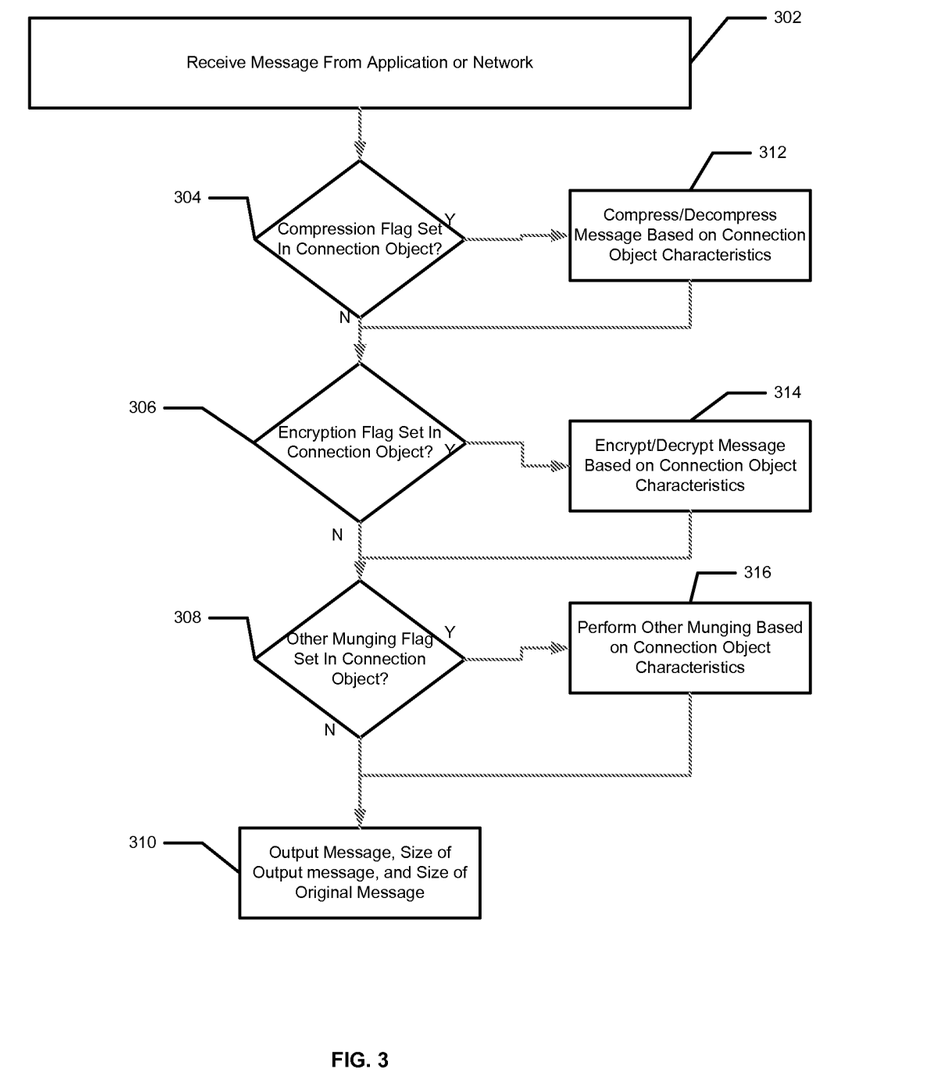
FIG. 3 is a method of munging data at a connection object in a transport layer in accordance with one embodiment of the present disclosure.

The operation of the communication network 100 can be better understood with reference to FIGS. 2 and 3. FIG. 2 illustrates a flow diagram of a particular embodiment of a method of establishing a communication session between peers. At block 202, application 120 at peer 102 requests a communication session an application (not shown) at peer 115 by sending a request message via the network 110. At block 204, application 120 determines whether an accept message has been received from peer 115. If not (e.g. if a "reject session" message has been received or if an accept message has not be received within an expected amount of time), the method flow moves to block 206 and the application 120 terminates the requested session.

If, at block 204, application 120 determines that peer 115 has accepted the communication session, the method flow moves to block 208 and peers 102 and 115 communicate the session capabilities requested by each peer. Such capabilities include the type of communication protocol to be implemented at the protocol layer, the type of encryption requested, if any, the type of compression requested, if any, and the like. At block 210, each peer determines if it can accept the requested capabilities. If not, the method flow moves to block 206 and the communication session is terminated.

If at block 210, each peer accepts the session capabilities requested by the other, the method flow moves to block 212 and the peers exchange munging information for the session, such as encryption/decryption keys, compression formats, and the like. At block 214, each peer modifies a corresponding connection object based on the munging information. The connection objects are modified to implement the session capabilities based on the exchanged munging information. Thus, the connection objects are formed to perform compression/decompression, encryption/decryption, or other data munging, or any combination thereof, based on the session capabilities and the exchanged munging information. At block 216, each peer in the communication session communicates messages via the connection objects. Each connection object performs the same munging operations for each message received from the associated application, according to the characteristics of the connection object as it was created. Each connection object is thus specifically tailored to implement the session capabilities and munging parameters for its associated communication session, improving the efficiency of the data munging.

FIG. 3 illustrates a flow diagram of a particular embodiment of a method of munging data at a connection object in a transport layer. At block 302, the connection object receives a message. The message can be received from the application associated with the object (an outgoing message) or from the protocol layer associated with the object (an incoming message). At block 304, it is determined whether a compression flag has been set at the connection object. This determination can be made when the connection object is created, so that the connection object always follows the same method flow for each received incoming message and the same flow for each outgoing message. In another embodiment, a pre-existing connection object can be modified to set the other munging flag based on session capabilities negotiated between peers or other devices in a communication session. If the compression flag has been set, the connection object is created or modified so that each outgoing message is compressed at block 312, and each incoming message is decompressed at block 312, by the data munger associated with the connection object. The method flow then proceeds to block 306. If the compression flag is not set, the method flow proceeds directly to block 306, so the connection object for the associated communication session does not compresses or decompresses messages.

At block 306, it is determined whether an encryption flag has been set. This determination can be made when the connection object is created, so that the connection object always follows the same method flow for each received incoming message and the same flow for each outgoing message. In another embodiment, a pre-existing connection object can be modified to set the encryption flag based on session capabilities negotiated between peers or other devices in a communication session. If the encryption flag has been set, the connection object is created or modified so that each outgoing message is encrypted at block 312, and each incoming message is decrypted at block 312, by the data munger associated with the connection object. The encryption and decryption is performed based on the data munger characteristics exchanged for the communication session. The method flow then proceeds to block 308. If the encryption flag is not set, the method flow proceeds directly to block 308, so the connection object for the associated communication session does not encrypt or decrypts messages.

At block 308, it is determined whether an "other munging" flag has been set. This determination can be made when the connection object is created, so that the connection object always follows the same method flow for each received incoming message and the same flow for each outgoing message. In another embodiment, a pre-existing connection object can be modified to set the other munging flag based on session capabilities negotiated between peers or other devices in a communication session. If the other munging flag has been set, the connection object is created or modified so incoming and outgoing messages are munged in some other way, by the data munger associated with the connection object. The method flow then proceeds to block 310. If the compression flag is not set, the method flow proceeds directly to block 310, so the connection object for the associated communication session never performs the other munging on messages.

At block 310, the compression object outputs the message that has resulted from munging, the size of the message, and the size of the original message. In the case of outgoing messages, this allows the protocol layer to form packets for communication that include the original size of a transformed message. This information can be used by the connection object at the receiving peer to appropriate munge the received message, so that the original message content is obtained.

Figure 4:
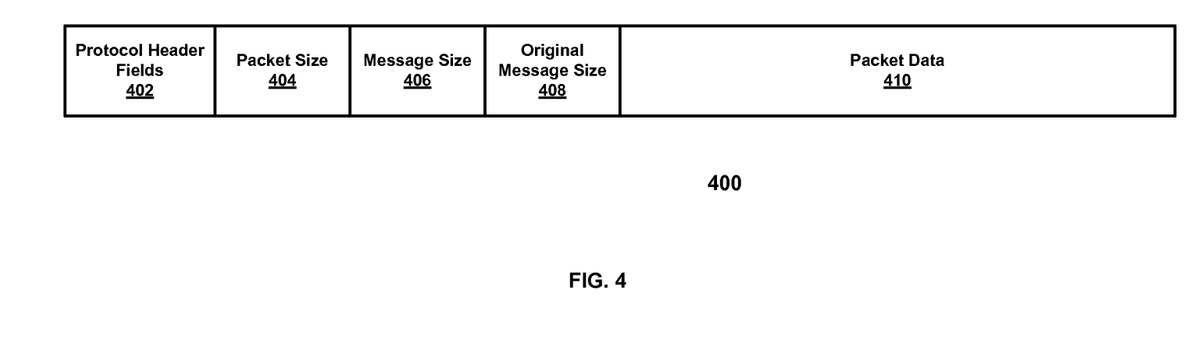
FIG. 4 is a block diagram of a packet format in accordance with one embodiment of the present disclosure.

FIG. 4 illustrates a block diagram of a packet 400 resulting from a message that has been transformed by the data munger of a connection object. The packet 400 can be formed by the protocol layer 135. The packet 400 includes protocol header fields 402, which store information in accordance with the communication protocol of a communication session. For example, the protocol header fields 402 can store TCP/IP protocol information, UDP protocol information, and the like. However, because the data associated with packet 400 has been munged at a connection object, neither the protocol fields 402 nor any other field carries the munging information used to transform the data or any indicators that the data has been transformed. An indicator that data has been transformed includes a flag, encryption code, compression information, or other information other than the data payload of the packet itself to indicate that the data payload carried by the packet has been transformed in a particular way. For example, the protocol fields 402 do not include a flag or other information to indicate whether the data has been compressed. The size of the packet 400 is thereby reduced, improving communication bandwidth.

The packet 400 also includes a packet size field 404, indicating the size of the packet 400. The packet 400 further includes a message size field 406, indicating the size of the message associated with the packet 400. The message size field 406 will typically indicate the size of the message resulting from the transformation at the data munger 140. The packet 400 also includes an original message size field 408, indicating the size of the original message associated with the packet 400, before the message was transformed by the data munger 140. This field provides useful information for the connection object at the target communication node to transform the received (transformed) message content to the original message. In addition, the packet 400 includes packet data field 410, which carries the data payload of the packet. This field can include a portion, or all of, the message as transformed by data munger 140.

Figure 5:
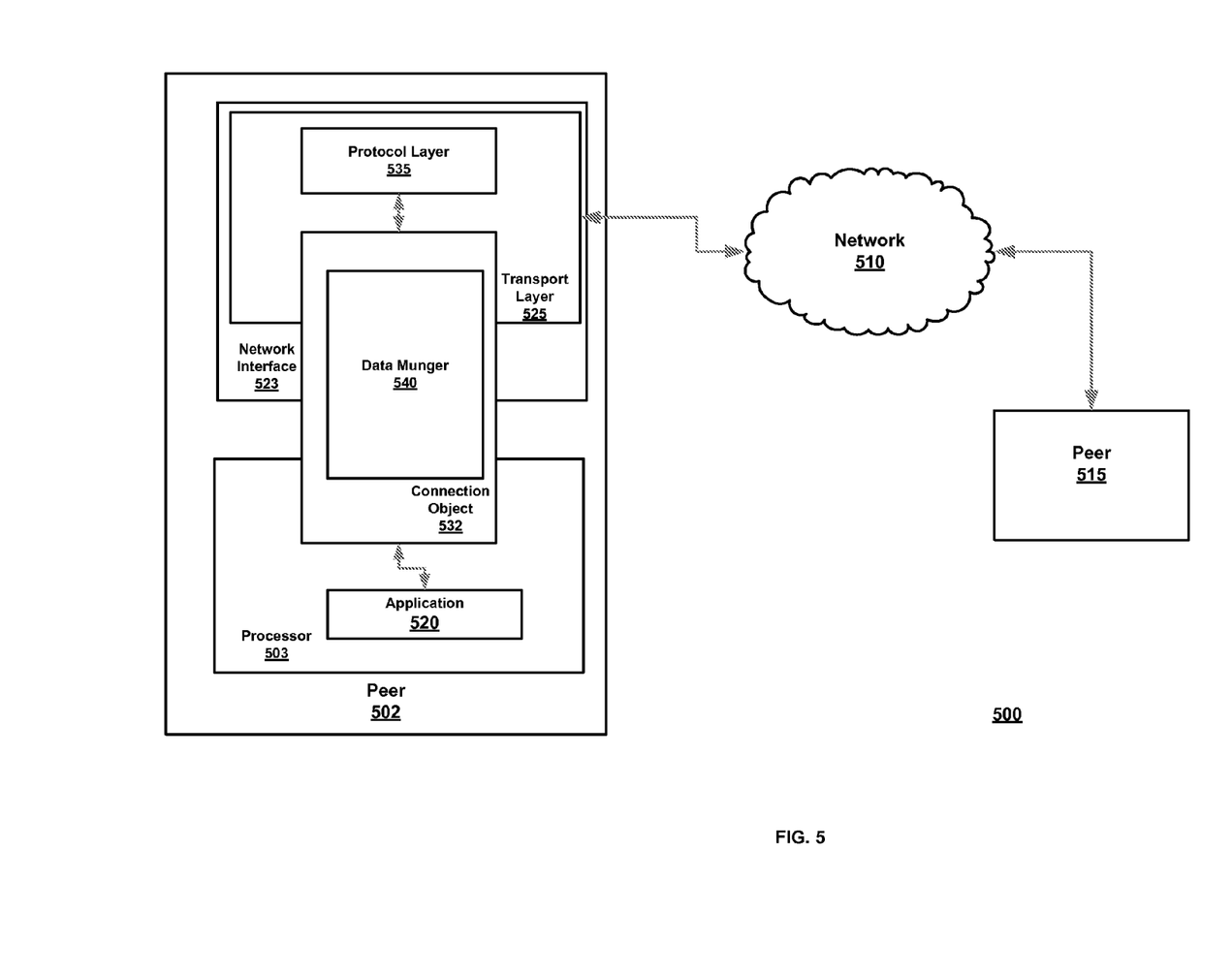
FIG. 5 is a block diagram of a communication network in accordance with another embodiment of the present disclosure.

FIG. 5 illustrates a communication network 500 in accordance with one embodiment of the present disclosure. The communication network 500 includes a peer 502, a network 510, and a peer 515, each of which is connected and configured similarly to the corresponding items of FIG. 1. The peer 502 includes a processor 503 configured to execute the application 520 and also includes a network interface 523 configured to execute the transport layer 525. In an embodiment, the network interface 523 is a network interface device, such as a network interface card or processor, configured to provide a physical layer interface between the network 510 and the processor 503. The network interface 523 can be located in the same physical housing as the processor 503, but remote from it, such as on another card or integrated circuit die. The transport layer 525 can implement a portion of the connection object 532, a portion of the data munger 540, and the protocol layer 535, similar to the corresponding elements of FIG. 1. Thus, in the illustrated embodiment of FIG. 5, portions of connection objects can be implemented at the network interface 523, thereby reducing load at the processor 503 and improving communication bandwidth.

In addition, as illustrated, portions of the connection object 532, and in particular portions of the data munger 540, can be implemented at the network interface 523, while other portions can be implemented at the processor 503. This allows each device to efficiently implement a particular munging process. For example, in one embodiment data munger 540 can perform compression at processor 503 and encryption via a hardware encryption module, at the network interface 503. In another embodiment, data munger 540 can perform encryption at processor 503 and compression via a hardware compression/decompression module, at the network interface 503. The device that implements data munging is transparent to the application 520, thereby reducing overhead at the application and improving communication bandwidth.

Figure 6:
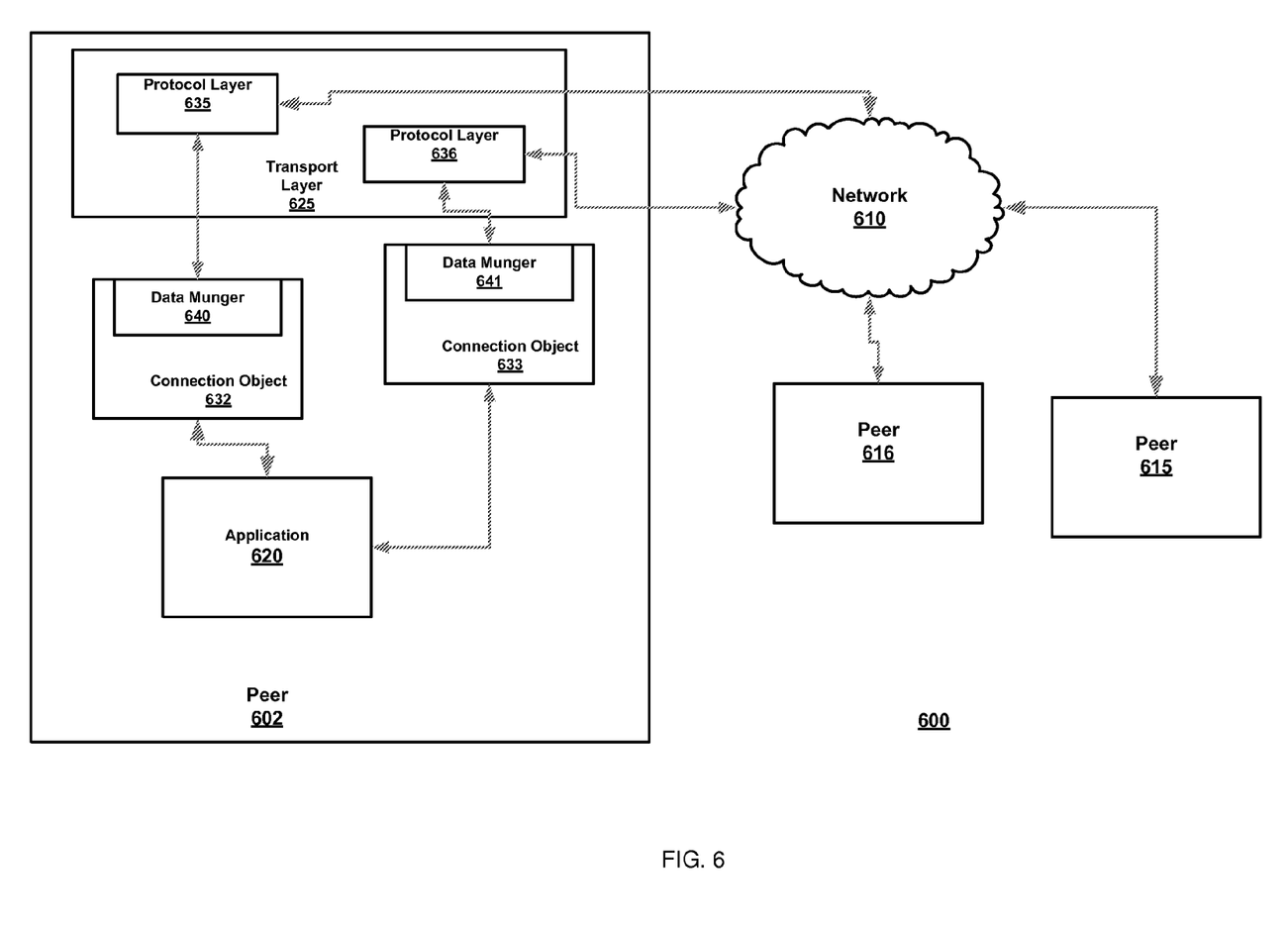
FIG. 6 is a block diagram of a communication network in accordance with another embodiment of the present disclosure.

FIG. 6 illustrates a communication network 600 in accordance with one embodiment of the present disclosure. The communication network 600 includes network 610 and peers

602, 615, and 616, each connected to the network 110. Peer 602 includes a transport layer 625 and an application 620.

In operation, application 620 can establish separate communication sessions with each of the peers 615 and 616 in similar fashion to that described with respect to FIGS. 1-5. Peer 602 can associate each communication session with a different communication object. For purposes of discussion, it is assumed that the communication session with peer 615 is associated with connection object 632, while the communication session with peer 616 is associated with connection object 633. During negotiation of each communication session, different communication parameters can be exchanged, and the data munger associated with connection objects 632 and 633 (data munger 640 and data munger 641, respectively) can be modified based on the communication parameters associated with the communication session. Thus, for example, data munger 640 can encrypt and decrypt messages without compression or decompression, while data munger 641 can compress and decompress received messages without encryption or decryption. In another embodiment, data munger 640 can encrypt or decrypt received messages based on a defined set of encryption keys associated with the communication session with peer 615, while data munger 641 encrypts or decrypts received messages based on a different set of defined encryption keys. In still another embodiment, data munger 640 can compress or decompress received messages based on a defined compression algorithm associated with the communication session with peer 615, while data munger 641 compresses or decompresses received messages based on a different defined compression algorithm.

In addition, each communication session can be associated with a different communication protocol, as implemented by protocol layers 635 and 636, respectively. Thus, in one embodiment, protocol layer 635 can implement a TCP protocol, while protocol layer 636 implements a UDP protocol. Because the compression objects 632 and 633 are independent of the associated protocol layer, they can efficiently perform data munging without regard to the particular protocol used to communicate packets embodying received messages.

It will be appreciated that the methods disclosed herein can be performed by a computer program stored on a computer readable medium that tangibly embodies the program. The computer program can include instructions to manipulate a processor to perform one or more of the methods described herein.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   determining, at a first network node, an establishment of a first communication session with a second network node;
   creating a first connection object at the first network node in response to determining the establishment of the first communication session;
   determining, at the first network node, a first communication parameter based on the first communication session;
   modifying, at the first network node, the first connection object based on the first communication parameter;
   receiving a message at the first connection object of the first network node during the first communication session, the message created by and received from a first application being executed at the first network node;
   transforming, at the first network node, the message based on a first characteristic of the first connection object, the first characteristic based on the first communication parameter;
   after transforming the message, creating a plurality of packets at the first network node based on the message according to a communication protocol; and
   providing a first packet of the plurality of packets from the first network node to the second network node, the first packet comprising a data payload including a portion of the message, a message size field including a transformed message size and an original message size field including a pre-transformed message size, wherein the first packet does not include an indicator of the first communication parameter.

2. The method of claim 1, wherein the first communication parameter is a compression parameter associated with the first communication session.

3. The method of claim 1, wherein the first communication parameter is an encryption parameter associated with the first communication session.

4. The method of claim 1, wherein the first connection object of the first network node is independent of a protocol layer of the first network node.

5. The method of claim 1, further comprising:
   determining a second communication parameter based on the first communication session;
   modifying the first connection object based on the second communication parameter;
   transforming the message based on a second characteristic of the first connection object, the second characteristic based on the second communication parameter; and
   wherein the first packet does not include an indicator of the second communication parameter.

6. The method of claim 1, wherein the first application is executed at a first processor of the first network node and, wherein the first connection object of the first network node is executed at a network interface device of the first network node different from the first processor, the network interface device provides a physical layer interface between the first processor and a network.

7. The method of claim 1, further comprising:
   determining at the first network node a second communication session;
   determining a second communication parameter based on the second communication session;
   modifying a second connection object based on the second communication parameter;
   receiving a second message at the second connection object during the second communication session;
   transforming the second message based on a second characteristic of the second connection object, the second characteristic based on the second communication parameter;
   communicating a second packet comprising a data payload including a portion of the second message, wherein the second packet does not include an indicator of the second communication parameter.

8. The method of claim 7, wherein the first communication parameter and the second communication parameter are different.

9. The method of claim 7, wherein the first packet is associated with a first communication protocol and the second packet is associated with a second communication protocol different from the first.

10. The method of claim 7, wherein the first communication parameter comprises encryption of a first type and the second communication parameter comprises encryption of a second type.

11. The method of claim 7, wherein the first communication parameter comprises compression of a first type and the second communication parameter comprises compression of a second type.

12. The method of claim 1, wherein the transformed message size indicates a size of the message associated with the first packet after transforming the message and the pre-transformed message size indicates a size of the message associated with the first packet before transforming the message.

13. A network device, comprising:
a first processor operable to execute a first application; and
a network interface device comprising a second processor, the network interface device operable to:
determine an establishment of a first communication session between the first processor of the network device and a remote network node;
create a first connection object in response to determining the establishment of the first communication session;
determine a first communication parameter based on the first communication session;
modify the first connection object based on the first communication parameter;
receive a message at the first connection object from the first application during the first communication session, the first application being executed by the first processor;
transform the message based on a first characteristic of the first connection object, the first characteristic based on the first communication parameter;
after transforming the message, create a plurality of packets based on the message according to a communication protocol; and
provide a first packet of the plurality of packets from the network interface device of the network device to the remote network node, the first packet comprising a data payload including a portion of the message, a message size field including a transformed message size and an original message size field including a pre-transformed message size, wherein the first packet does not include an indicator of the first communication parameter.

14. The network device of claim 13, wherein the first communication parameter is a compression parameter associated with the first communication session.

15. The network device of claim 13, wherein the first communication parameter is an encryption parameter associated with the first communication session.

16. The network device of claim 13, wherein the first connection object is independent of a protocol layer of the remote network node.

17. The network device of claim 13, wherein the network interface device is further operable to:
determine a second communication parameter based on the first communication session;
modify the first connection object based on the first communication parameter;
transform the message based on a second characteristic of the first connection object, the second characteristic based on the second communication parameter; and
wherein the first packet does not include an indicator of the second communication parameter.

18. The network device of claim 13, wherein the network interface device is further operable to:
determine a second communication session between the first processor and a second remote network node;
determine a second communication parameter based on the second communication session;
modify a second connection object based on the second communication parameter;
receive a second message at the second connection object during the second communication session;
transform the second message based on a second characteristic of the second connection object, the second characteristic based on the second communication parameter;
communicate a second packet comprising a data payload including a portion of the second message, wherein the second packet does not include an indicator of the second communication parameter.

19. The network device of claim 18, wherein the first communication parameter and the second communication parameter are different.

20. The network device of claim 18, wherein the first packet is associated with a first communication protocol and the second packet is associated with a second communication protocol different from the first.

21. The network device of claim 18, wherein the first communication parameter comprises encryption of a first type and the second communication parameter comprises encryption of a second type.

22. The network device of claim 13, wherein the transformed message size indicates a size of the message associated with the first packet after transforming the message and the pre-transformed message size indicates a size of the message associated with the first packet before transforming the message.

23. A method, comprising:
creating a first connection object at a first network node in response to determining an establishment of a first communication session with a second network node;
determining, at the first network node, a first communication parameter based on the first communication session;
modifying, at the first network node, the first connection object based on the first communication parameter, wherein the first connection object is executed at a network interface device of the first network node, and the first connection object of the first network node is independent of a protocol layer of the first network node;
receiving a message at the first connection object of the first network node during the first communication session, the message created by and received from a first application being executed at a first processor of the first network node, wherein the first processor of the first network node is different than the network interface device of the first network node;
transforming, at the first network node, the message based on a first characteristic of the first connection object, the first characteristic based on the first communication parameter;
after transforming the message, creating a plurality of packets at the first network node based on the message according to a communication protocol, each packet comprising a message size field including a transformed message size and an original message size field including a pre-transformed message size, and;

providing at least a first packet of the plurality of packets from the first network node to the second network node.

24. The method of claim 23, wherein the first packet of the plurality of packets comprises a data payload including a portion of the message, and wherein the first packet does not include an indicator of the first communication parameter.

25. The method of claim 23, wherein the network interface device of the first network node provides a physical layer interface between the first processor of the first network node and an external network.

26. The method of claim 23, wherein the first communication parameter is a compression parameter or an encryption parameter associated with the first communication session.

27. The method of claim 23, wherein the transformed message size indicates a size of the message associated with the first packet after transforming the message and the pre-transformed message size indicates a size of the message associated with the first packet before transforming the message.

* * * * *